United States Patent
Suh et al.

(10) Patent No.: US 11,276,533 B2
(45) Date of Patent: Mar. 15, 2022

(54) PROCESS FOR PREPARING ANODE ACTIVE MATERIAL FOR PSEUDOCAPACITOR

(71) Applicant: LG CHEM, LTD., Seoul (KR)

(72) Inventors: Donghoon Suh, Daejeon (KR); Seokhyun Yoon, Daejeon (KR); Byunggook Lyu, Daejeon (KR)

(73) Assignee: LG CHEM, LTD., Seoul (KR)

( * ) Notice: Subject to any disclaimer, the term of this patent is extended or adjusted under 35 U.S.C. 154(b) by 260 days.

(21) Appl. No.: 16/626,188

(22) PCT Filed: Oct. 17, 2018

(86) PCT No.: PCT/KR2018/012276
§ 371 (c)(1),
(2) Date: Dec. 23, 2019

(87) PCT Pub. No.: WO2019/103314
PCT Pub. Date: May 31, 2019

(65) Prior Publication Data
US 2020/0219668 A1 Jul. 9, 2020

(30) Foreign Application Priority Data
Nov. 24, 2017 (KR) .................. 10-2017-0158926

(51) Int. Cl.
*H01G 11/46* (2013.01)
*H01G 11/24* (2013.01)
*H01G 11/86* (2013.01)

(52) U.S. Cl.
CPC ............ *H01G 11/46* (2013.01); *H01G 11/24* (2013.01); *H01G 11/86* (2013.01)

(58) Field of Classification Search
CPC ........ H01G 11/48; H01G 11/46; H01G 11/24; H01G 11/86
See application file for complete search history.

(56) References Cited

U.S. PATENT DOCUMENTS

| 5,070,050 | A | | 12/1991 | Dupon et al. |
| 5,071,814 | A | * | 12/1991 | Sasaki .................. B01J 23/002 502/205 |
| 7,972,726 | B2 | | 7/2011 | Eylem et al. |

(Continued)

FOREIGN PATENT DOCUMENTS

| CN | 100584763 C | 1/2010 |
| CN | 104487169 A | 4/2015 |

(Continued)

OTHER PUBLICATIONS

Ciszewski, et al.: "Reduced graphene oxide-bismuth oxide composite as electrode material for supercapacitors", XP035436558, Ioniks, Kiel, DE, vol. 21, No. 2, Jun. 20, 2014, pp. 557-563.

(Continued)

*Primary Examiner* — Seahvosh Nikmanesh
(74) *Attorney, Agent, or Firm* — Dentons US LLP (57) ABSTRACT

A method of preparing an anode active material for a pseudocapacitor is provided. According to the present invention, a method of preparing an anode active material for a pseudocapacitor, which enables expression of high specific capacitance and excellent output characteristics, is provided.

7 Claims, 8 Drawing Sheets

(56) References Cited

U.S. PATENT DOCUMENTS

| | | | |
|---|---|---|---|
| 2011/0062029 A1 | 3/2011 | Isono et al. | |
| 2012/0101222 A1* | 4/2012 | Horstman | C09D 183/14 524/588 |
| 2015/0321189 A1 | 11/2015 | Miyamura et al. | |
| 2016/0235673 A1 | 8/2016 | Preisig et al. | |
| 2018/0123055 A1* | 5/2018 | Park | H01L 51/50 |

FOREIGN PATENT DOCUMENTS

| | | |
|---|---|---|
| CN | 104752069 A | 7/2015 |
| CN | 104174415 B | 5/2016 |
| CN | 105555259 A | 5/2016 |
| CN | 104140097 B | 6/2016 |
| CN | 106298263 A | 1/2017 |
| CN | 106410128 A | 2/2017 |
| CN | 106449151 A | 2/2017 |
| CN | 105024056 B | 4/2017 |
| CN | 106964334 A | 7/2017 |
| CN | 104795536 B | 8/2017 |
| JP | 2011-63843 A | 3/2011 |
| JP | 2016-531160 A | 10/2016 |
| JP | 2017-105911 A | 6/2017 |
| KR | 10-0927181 B1 | 11/2009 |

OTHER PUBLICATIONS

International Search Report from PCT/KR2018/012276, dated Feb. 28, 2019.
Written Opinion of the ISA from PCT/KR2018/012276, dated Feb. 28, 2019.
Shinde, et al.: "A binder-free wet chemical synthesis approach to decorate nanoflowers of bismuth oxide on Ni-foam for fabricating laboratory scale potential pencil-type asymmetric supercapacitor device." Dalton Transactions, vol. 46, Apr. 10, 2017, pp. 6601-6611.
Aijuan, Han: "Development of bismuth based visible-light-driven photocatalysts for the degradation of organic pollutants." National University of Singapore, Aug. 5, 2014, pp. 1-229.
Patil, et al.: "Synthesis of bismuth oxide nanoparticles at 100° C.", Materials Letters, Elsavier, vol. 59, 2005, pp. 2523-2525.
Wang, et al.: "Characterization of porous bismuth oxide ($Bi_2O_3$) nanoplates prepared by chemical bath deposition and post annealing.", RSC Advances, vol. 5, 2015, pp. 65591-65594.

* cited by examiner

Bi(OH)$_3$ phase. The anode material synthesized by such processes has a structural feature of relatively small aggregation, and thus enables expression of high specific capacitance and excellent output characteristics, as compared with nanoparticles having the same composition prepared by any method other than the above processes.

According to one embodiment of the present invention, a method of preparing an anode active material for a pseudocapacitor is provided, the method including the steps of:

forming a first precipitate by dropwise adding triethanolamine to a bismuth nitrate (Bi(NO$_3$)$_3$) aqueous solution;

obtaining a second precipitate by refluxing the solution containing the first precipitate; and obtaining bismuth(III) oxide nanoparticles by heat-treating the second precipitate.

Hereinafter, each of the steps which may be included in the method of preparing the anode active material for a pseudocapacitor will be described in more detail.

According to an embodiment of the present invention, the step of forming a first precipitate by dropwise adding triethanolamine to a bismuth nitrate (Bi(NO$_3$)$_3$) aqueous solution is performed.

The bismuth nitrate aqueous solution is a homogeneous mixture in which bismuth nitrate is dissolved in a solvent such as distilled water or deionized water.

Preferably, the bismuth nitrate aqueous solution may be a 50 to 100 mN (based on bismuth) aqueous solution containing bismuth nitrate(III) pentahydrate (Bi(NO$_3$)$_3$.5H$_2$O) as a solute. Specifically, a concentration of the bismuth nitrate aqueous solution may preferably be 50 mN or more, or 55 mN or more, and 100 mN or less, 90 mN or less, 80 mN or less, or 70 mN or less, based on bismuth.

That is, to allow sufficient formation of the precipitate by dropwise adding triethanolamine, the concentration of the bismuth nitrate aqueous solution is preferably 50 mN or more. However, when the concentration is too high, the unreacted solute may be included in the precipitate to decrease the efficiency of the precipitate formation reaction. Thus, the concentration of the bismuth nitrate aqueous solution is preferably 100 mN or less.

The triethanolamine is added dropwise to the bismuth nitrate aqueous solution to allow a first white precipitate to be slowly formed.

In this regard, the triethanolamine is added dropwise at a volume ratio of 1:0.001 to 1:0.1, based on the volume of the bismuth nitrate aqueous solution. Specifically, the triethanolamine may preferably be added dropwise at a volume ratio of 1:0.001 or more, 1:0.005 or more, 1:0.010 or more, or 1:0.015 or more, and 1:0.1 or less, 1:0.05 or less, or 1:0.025 or less, based on the volume of the bismuth nitrate aqueous solution.

In other words, to allow sufficient formation of the first precipitate by dropwise adding the triethanolamine, the triethanolamine is preferably added dropwise at a volume ratio of 1:0.001 or more with respect to the bismuth nitrate aqueous solution. However, when an excess amount of triethanolamine is added, the efficiency of the first precipitate formation may be decreased. Therefore, the triethanolamine is preferably added dropwise at a volume ratio of 1:0.1 or less with respect to the bismuth nitrate aqueous solution.

The step of obtaining a second precipitate by refluxing the solution containing the first precipitate is performed.

The refluxing may be performed using a common reflux apparatus.

As a non-limiting example, the solution containing the first precipitate is put in an appropriate vessel, for example, a round-bottom flask. This vessel is connected to a water-cooled Liebig or Vigreux condenser, which is generally open to the atmosphere at the top. The vessel is directly or indirectly heated to boil the solution containing the first precipitate. Vapor produced from the solution may be condensed by the condenser, and returned to the vessel by gravity. Through refluxing, formation of the nanoparticle-phased second precipitate from the first precipitate may be facilitated, and a precursor of the anode active material that enables expression of the effects according to the present invention may be formed.

According to an embodiment of the present invention, the refluxing is preferably performed at 50° C. to 100° C. for 5 hours to 24 hours.

That is, the refluxing may be continuously performed at a 100° C. or lower which is a boiling point of the solvent for 5 hours to 24 hours, 10 hours to 24 hours, or 12 hours to 24 hours, which is advantageous in terms of formation of the nanoparticle-phased second precipitate. However, when the refluxing is performed at an excessively low temperature and/or for a very short time, the efficiency of the second precipitate formation may be reduced. Therefore, the refluxing may preferably be performed at a temperature of 50° C. or higher, 60° C. or higher, or 70° C. or higher for the above range of time.

Through the refluxing, the white nanoparticle-phased second precipitate is formed in the vessel. The second precipitate has the same composition as the first precipitate. However, the first precipitate in a form in which it is difficult to specify its particle size is contained in the solution, and through the refluxing, the second precipitate having a nanoscale particle size may be obtained.

The second precipitate precipitated in the vessel may be separated by a common method, such as centrifugation, etc.

Optionally, a step of washing the second precipitate may be further performed.

The washing is a process of removing impurities from the second precipitate. The washing may be performed by a method of washing the second precipitate several times using a solvent such as distilled water, deionized water, or ethanol.

Optionally, a step of drying the washed second precipitate may be further performed. The drying may be performed using a vacuum oven. Alternatively, the drying may be performed by a common freeze-drying method.

Preferably, the drying may be performed at a temperature of 20° C. to 80° C. Specifically, the drying may be performed at a temperature of 20° C. or higher, 25° C. or higher, 40° C. or higher, or 60° C. or higher, and 80° C. or lower, or 70° C. or lower.

Subsequently, the step of obtaining bismuth(III) oxide nanoparticles by heat-treating the second precipitate is performed.

According to an embodiment of the present invention, the heat-treatment may be performed in an oxygen atmosphere at 150° C. to 300° C. for 1 hour to 5 hours, which is preferable in terms of obtaining the bismuth(III) oxide nanoparticles as an anode active material satisfying the above-described characteristics.

Specifically, the heat treatment may be performed in an oxygen atmosphere at 150° C. or higher, or 200° C. or higher; and 300° C. or lower, or 250° C. or lower, and the heat treatment may be continuously or discontinuously performed for 60 minutes or longer, 90 minutes or longer, or 120 minutes or longer, and 300 minutes or shorter, 240 minutes or shorter, or 180 minutes or shorter.

Optionally, the step of pulverizing the bismuth(III) oxide nanoparticles obtained by the above heat-treatment may be performed.

The pulverizing is a step of providing an anode active material having more improved activity by increasing a specific surface area of the bismuth(III) oxide nanoparticles. This step may be optionally performed.

According to an embodiment of the present invention, the bismuth(III) oxide nanoparticles prepared by the above-described method may have an average particle diameter of 500 nm to 5000 nm.

Here, the average particle diameter of the nanoparticles means an arithmetic mean calculated based on the greatest outer diameter of individual particles, as measured with a scanning electron microscope.

The bismuth(III) oxide nanoparticles prepared by the above method may be applied to an anode active material for a pseudocapacitor, which enables expression of high specific capacitance and excellent output characteristics.

Meanwhile, the anode for a pseudocapacitor may include common components such as a conductive material and a binder, together with the bismuth(III) oxide nanoparticles prepared by the above method.

The conductive material is used to provide an anode with conductivity, and is not particularly limited as long as it has electrical conductivity without causing chemical changes. Non-limiting examples of the conductive material may include natural graphite, artificial graphite, carbon black, acetylene black, Ketjen black, channel black, furnace black, lamp black, thermal black, carbon fibers, etc.

Further, the binder may be used to improve adhesion between materials constituting the anode, and adhesive force between the collector and the anode. Non-limiting examples of the binder may include polyvinylidene fluoride (PVDF), a vinylidene fluoride-hexafluoropropylene copolymer (PVDF-co-HFP), polyvinyl alcohol, polyacrylonitrile, carboxymethyl cellulose, starch, hydroxypropyl cellulose, polyvinyl pyrrolidone, tetrafluoroethylene, polyethylene, polypropylene, an ethylene-propylene-diene polymer (EPDM), sulfonated-EPDM, styrene butadiene rubber (SBR), fluorine rubber, etc.

The anode for a pseudocapacitor may be manufactured by applying the above-described components onto a collector made of a material such as copper, aluminum, nickel, or stainless steel, followed by pressing and drying.

The pseudocapacitor may have a structure including the anode, a common positive electrode, a separator interposed between the positive electrode and the anode, and an electrolyte.

According to the present invention, a method of preparing an anode active material for a pseudocapacitor, which enables expression of high specific capacitance and excellent output characteristics, is provided.

EXAMPLES

Hereinafter, preferred examples will be provided for better understanding of the present invention. However, the following examples are for illustrative purposes only, and the present invention is not intended to be limited thereby.

Example 1

3.0 g of bismuth nitrate(III) pentahydrate (Bi(NO$_3$)$_3$.5H$_2$O) and 100 mL of deionized water were put into and stirred in a round bottom flask having a volume of 250 mL to prepare a homogeneous bismuth nitrate aqueous solution.

A total of 2 mL of triethanolamine was slowly added dropwise to the round bottom flask, and formation of a first white precipitate was confirmed.

The round bottom flask was placed in a reflux apparatus provided with a condenser, a heating mantle, and a thermocouple probe, followed by refluxing for 12 hours while heating at a temperature of 70° C. By refluxing, a second white precipitate having a nanoscale particle size was formed from the first precipitate.

The second precipitate was recovered using a centrifuge, and then washed with deionized water and ethanol to remove impurities.

The washed second precipitate was dried in a vacuum oven at 70° C.

The dried second precipitate was continuously heat-treated in an oxygen atmosphere at 200° C. for 2 hours to obtain bismuth(III) oxide nanoparticles (SDH-68).

Comparative Example 1

3.0 g of bismuth nitrate(III) pentahydrate (Bi(NO$_3$)$_3$.5H$_2$O) and 6 mL of 60% nitric acid were put into and stirred in a round bottom flask having a volume of 250 mL to prepare a homogeneous solution.

30 mL of propanol and 30 mL of N-methyl-2-pyrrolidone were added to the round bottom flask, followed by stirring.

1 g of citric acid was added thereto, and further stirred, and then 20 ml of a 9 M NaOH aqueous solution was added dropwise thereto to confirm formation of a precipitate.

The round bottom flask was placed in a reflux apparatus provided with a condenser, a heating mantle, and a thermocouple probe, followed by refluxing for 12 hours while heating at a temperature of 80° C. By refluxing, a nanoscale precipitate was formed.

The nanoscale precipitate was recovered using a centrifuge, and then washed with deionized water and ethanol to remove impurities.

The washed precipitate was dried in a vacuum oven at 70° C.

The dried precipitate was continuously heat-treated in an oxygen atmosphere at 400° C. for 2 hours to obtain bismuth (III) oxide (SDH-63).

Comparative Example 2

3.0 g of bismuth nitrate(III) pentahydrate (Bi(NO$_3$)$_3$.5H$_2$O) and 6 mL of 60% nitric acid were put into and stirred in a round bottom flask having a volume of 250 mL to prepare a homogeneous solution.

60 mL of propanol and 60 mL of N-methyl-2-pyrrolidone were added to the round bottom flask, followed by stirring.

1 g of citric acid and 1 g of carbon nanotube powder were added thereto, and further stirred, and then 20 ml of a 9 M NaOH aqueous solution was added dropwise thereto to confirm formation of a precipitate.

The round bottom flask was placed in a reflux apparatus provided with a condenser, a heating mantle, and a thermocouple probe, followed by refluxing for 12 hours while heating at a temperature of 80° C. By refluxing, a nanoscale precipitate was formed.

The nanoscale precipitate was recovered using a centrifuge, and then washed with deionized water and ethanol to remove impurities.

The washed precipitate was dried in a vacuum oven at 70° C.

The dried precipitate was continuously heat-treated in an oxygen atmosphere at 200° C. for 2 hours to obtain a bismuth(III) oxide nanoparticle-containing carbon nanotube complex (SDH-66).

Comparative Example 3

3.0 g of bismuth nitrate(III) pentahydrate ($Bi(NO_3)_3 \cdot 5H_2O$) and 6 mL of 60% nitric acid were put into and stirred in a round bottom flask having a volume of 250 mL to prepare a homogeneous solution.

60 mL of propanol and 60 mL of N-methyl-2-pyrrolidone were added to the round bottom flask, followed by stirring.

1 g of citric acid and 1 g of lithium acetate ($C_2H_3LiO_2$) were added thereto, and further stirred, and then 20 ml of a 9 M NaOH aqueous solution was added dropwise thereto to confirm formation of a precipitate.

The round bottom flask was placed in a reflux apparatus provided with a condenser, a heating mantle, and a thermocouple probe, followed by refluxing for 12 hours while heating at a temperature of 80° C. By refluxing, a nanoscale precipitate was formed.

The nanoscale precipitate was recovered using a centrifuge, and then washed with deionized water and ethanol to remove impurities.

The washed precipitate was dried in a vacuum oven at 70° C.

The dried precipitate was continuously heat-treated in an oxygen atmosphere at 200° C. for 2 hours to obtain excess lithium-containing bismuth(III) oxide (SDH-70).

Experimental Example 1

Figure 1:
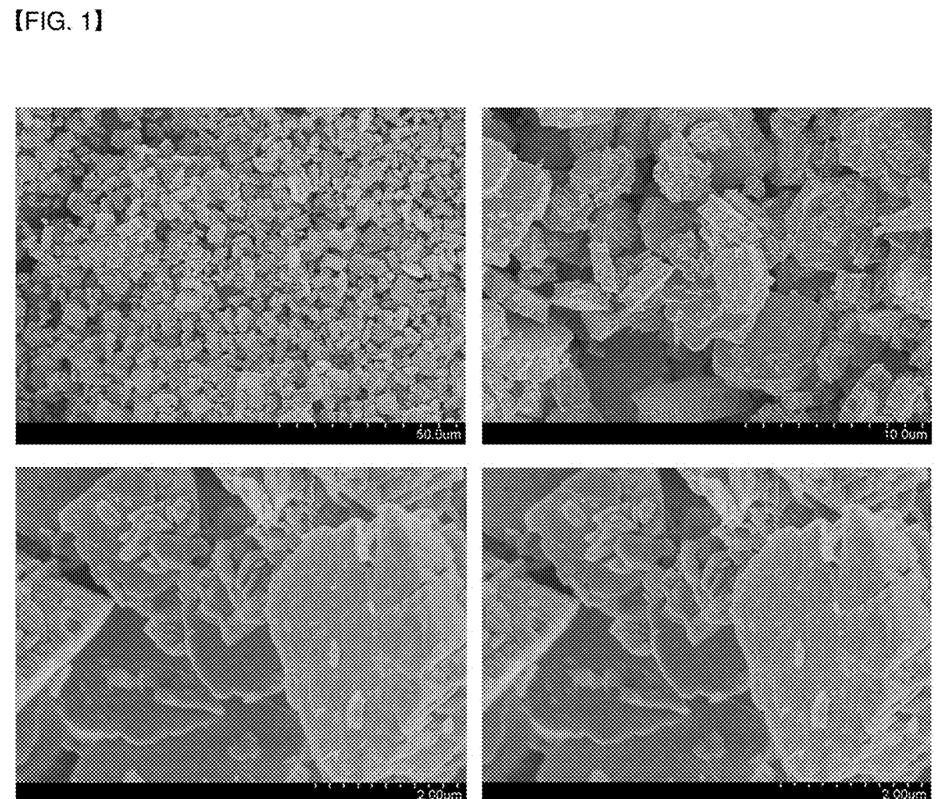
Figure 2:
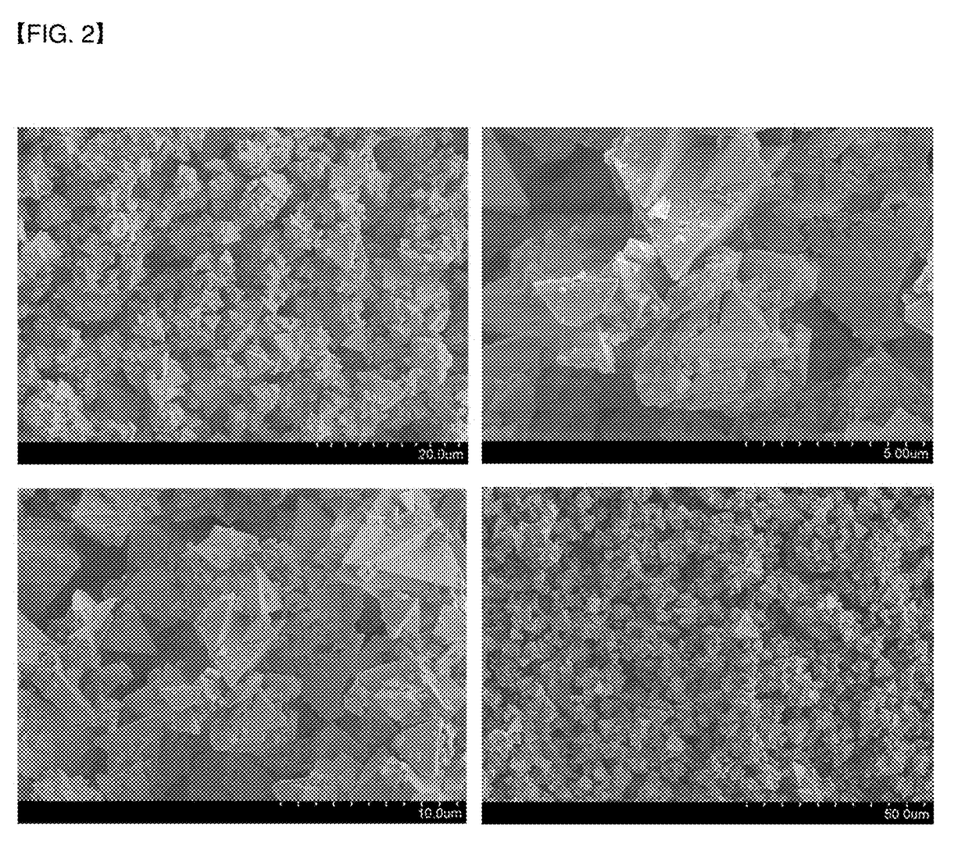
Figure 3:
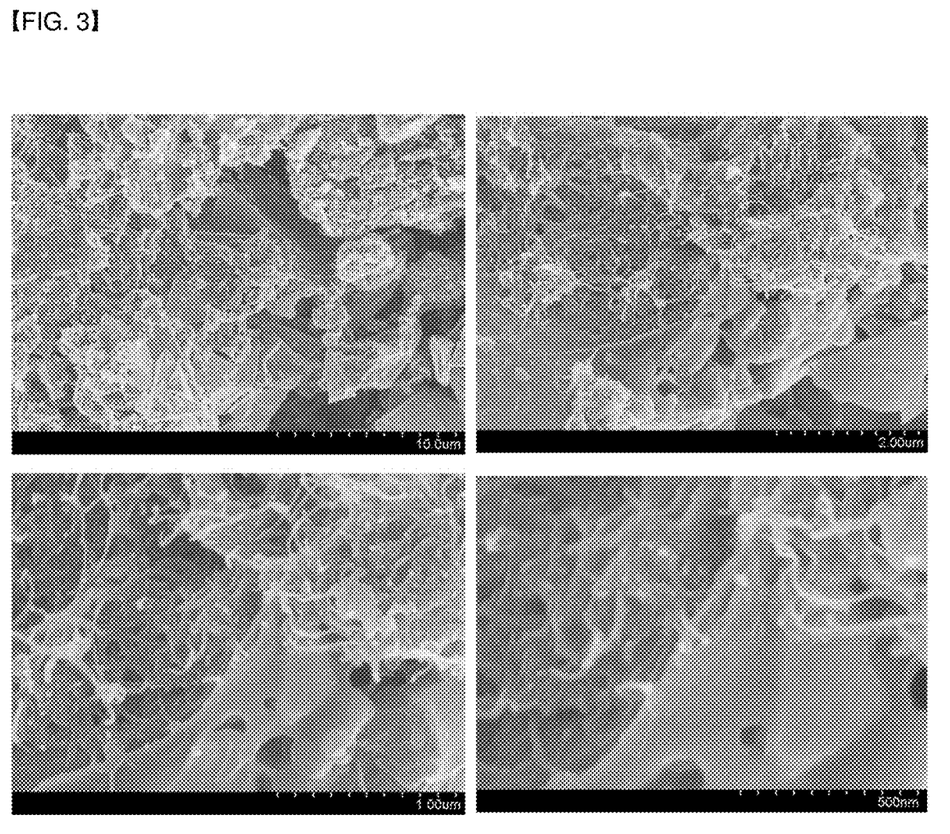
Figure 4:
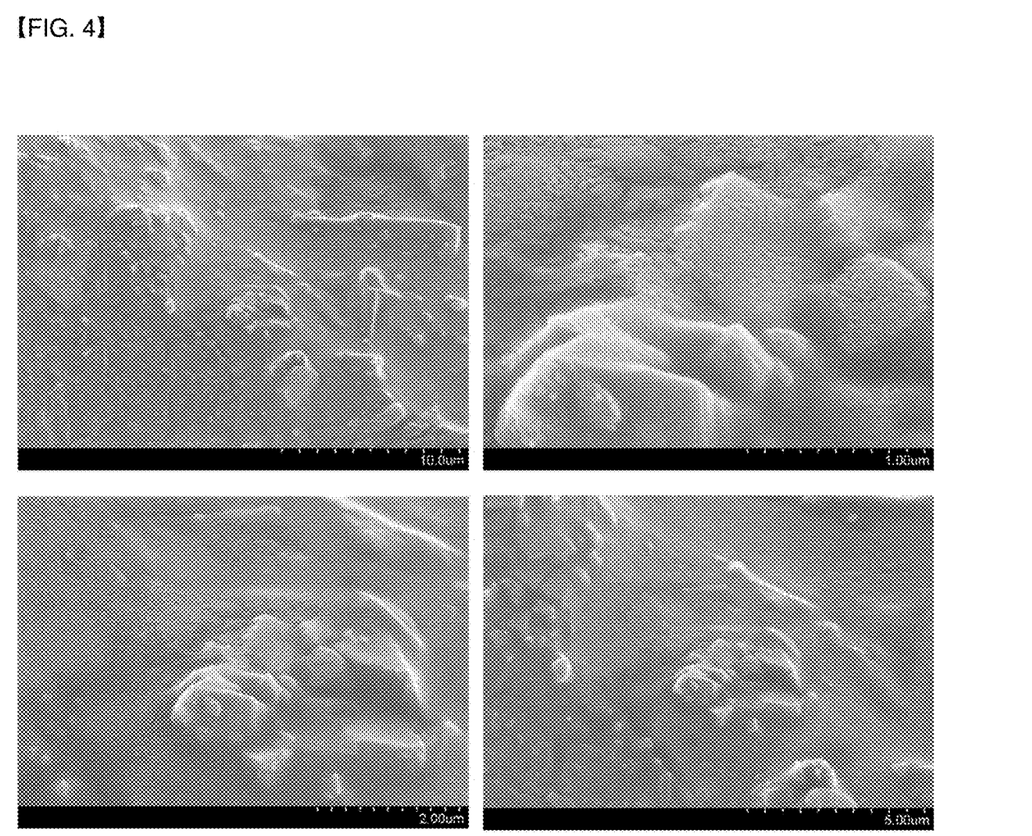

The anode active materials for a pseudocapacitor according to the example and comparative examples were photographed using a scanning electron microscope (SEM) at different magnifications. The photographed images are shown in FIG. 1 (Example 1), FIG. 2 (Comparative Example 1), FIG. 3 (Comparative Example 2), and FIG. 4 (Comparative Example 3).

Referring to FIGS. 1 to 4, it was confirmed that the aggregation phenomenon of the bismuth(III) oxide nanoparticles according to Example 1 was not relatively severe, as compared with those of the bismuth(III) oxides according to Comparative Example 2 and Comparative Example 3, and therefore, it may be more appropriately used as an anode active material for a pseudocapacitor. The bismuth(III) oxide according to Comparative Example 1 showed a smooth surface, whereas the bismuth(III) oxide according to Example 1 showed a relatively rough surface, implying that accessibility of an electrolyte to the bismuth(III) oxide according to Example 1 is better.

Experimental Example 2

Pseudocapacitors were manufactured using the anode active materials for a pseudocapacitor according to the example and comparative examples by the following method, and then IVIUMSTAT equipment (manufactured by Ivium Technologies) was used to obtain a cyclic voltammetry graph for each pseudocapacitor.

Each of the anode active materials, carbon black, and a binder (PVDF) were mixed at a weight ratio of 7:2:1 to prepare a composition for forming an anode. The composition was applied onto a glassy carbon electrode (GCE), and then dried under vacuum and dried at 70° C. for 24 hours. An electrolyte (1 M $Li_2SO_4$) was impregnated into the manufactured electrode, and stabilized, followed by cyclic voltammetry using a platinum counter electrode and an SCE reference electrode. At this time, cyclic voltammetry was performed in the potential range of −0.9 V to 0.2 V at a scan rate of 10 mV/s.

Figure 5:
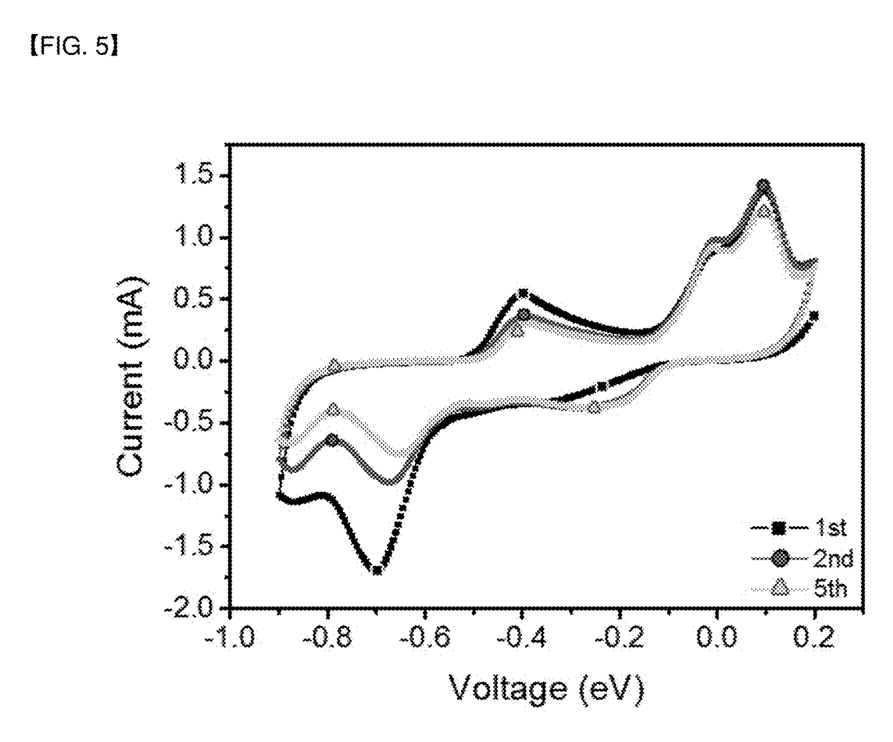
Figure 6:
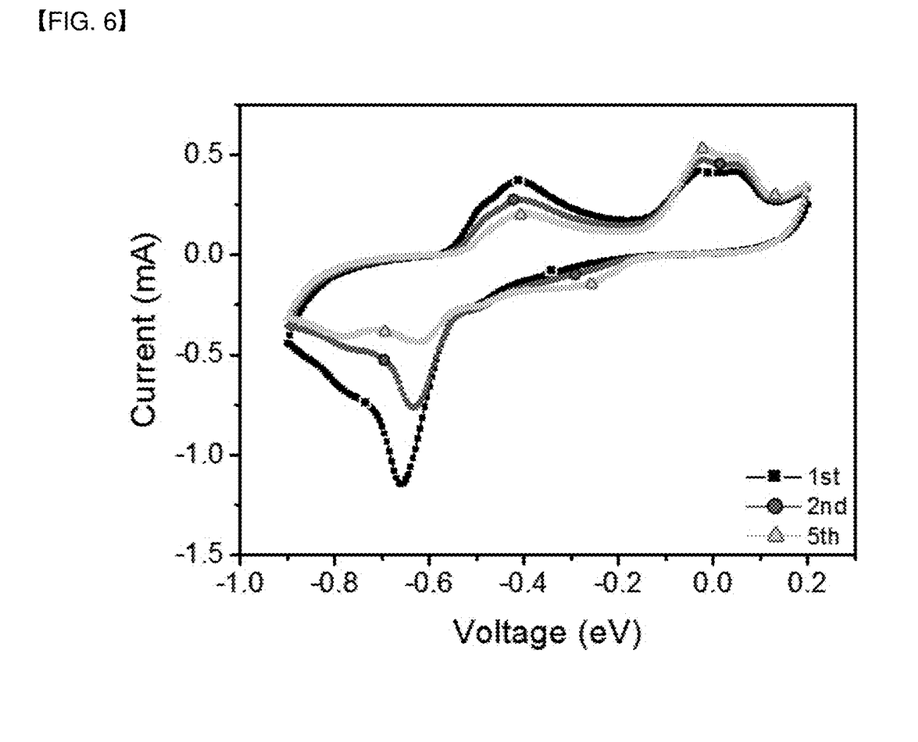
Figure 7:
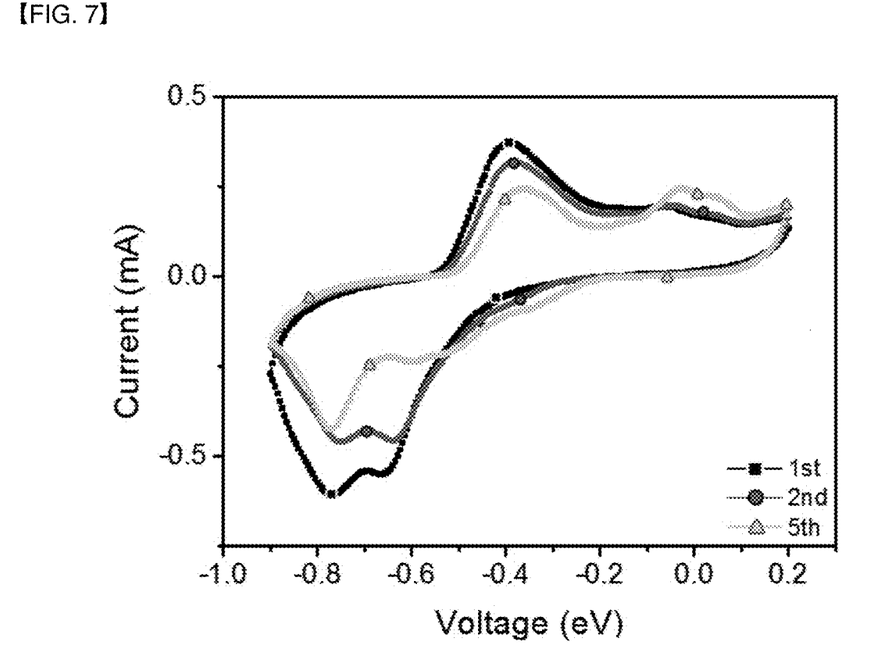
Figure 8:
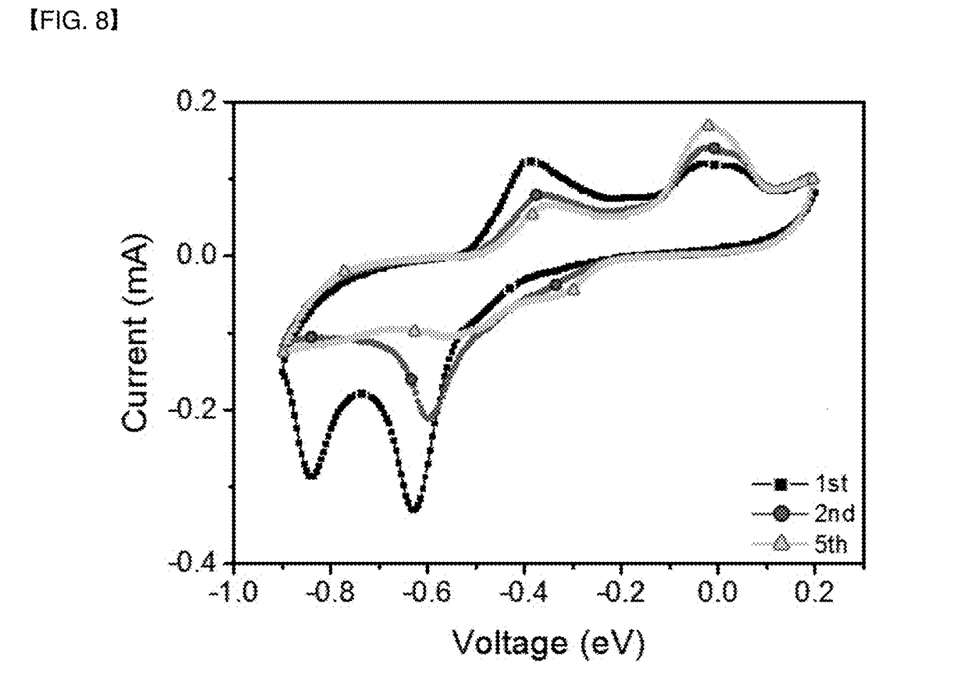

The cyclic voltammetry graphs thus obtained by the method are shown in FIG. 5 (Example 1), FIG. 6 (Comparative Example 1), FIG. 7 (Comparative Example 2), and FIG. 8 (Comparative Example 3), and the measured values of specific capacitance are shown in the following Table 1.

TABLE 1

| Cycle | Example 1 | Comparative Example 1 | Comparative Example 2 | Comparative Example 3 |
|---|---|---|---|---|
| $1^{st}$ | 192.25 F/g | 106.62 F/g | 73.57 F/g | 31.03 F/g |
| $2^{nd}$ | 177.33 F/g | 101.13 F/g | 66.89 F/g | 27.36 F/g |
| $5^{th}$ | 155.92 F/g | 96.52 F/g | 60.89 F/g | 27.02 F/g |

Referring to Table 1 and FIGS. 5 to 8, the pseudocapacitor to which the anode active material of Example 1 was applied showed high specific capacitance of 192.25 F/g and specific capacitance of 155.92 F/g even after a 5th cycle.

Although the anode active materials according to the comparative examples were prepared under reflux conditions similar to those of the example, they showed remarkably low specific capacitance, as compared with that of Example 1.

The invention claimed is:

1. A method of preparing an anode active material, the method comprising the steps of:
    forming a first precipitate by dropwise adding triethanolamine to a bismuth nitrate ($Bi(NO_3)_3$) aqueous solution;
    obtaining a second precipitate by refluxing the solution containing the first precipitate; and
    obtaining bismuth(III) oxide nanoparticles by heat-treating the second precipitate.

2. The method of claim 1, wherein the bismuth nitrate aqueous solution is a 50 to 100 mN (based on bismuth) aqueous solution containing bismuth nitrate(III) pentahydrate ($Bi(NO_3)_3 \cdot 5H_2O$) as a solute.

3. The method of claim 1, wherein the triethanolamine is added dropwise at a volume ratio of 1:0.001 to 1:0.1, based on the volume of the bismuth nitrate aqueous solution.

4. The method of claim 1, wherein the refluxing is performed at 50° C. to 100° C. for 5 hours to 24 hours.

5. The method of claim 1, wherein the heat treatment is performed in an oxygen atmosphere at 150° C. to 300° C. for 1 hour to 5 hours.

6. The method of claim 1, further comprising the steps of:
    drying the washed second precipitate; and
    obtaining bismuth(III) oxide nanoparticles by heat-treating the dried second precipitate.

7. The method of claim 1, wherein the bismuth(III) oxide nanoparticles have an average particle diameter of 500 nm to 5000 nm, based on the greatest outer diameter of individual particles, as measured by a scanning electron microscope.

* * * * *